Figure 1:
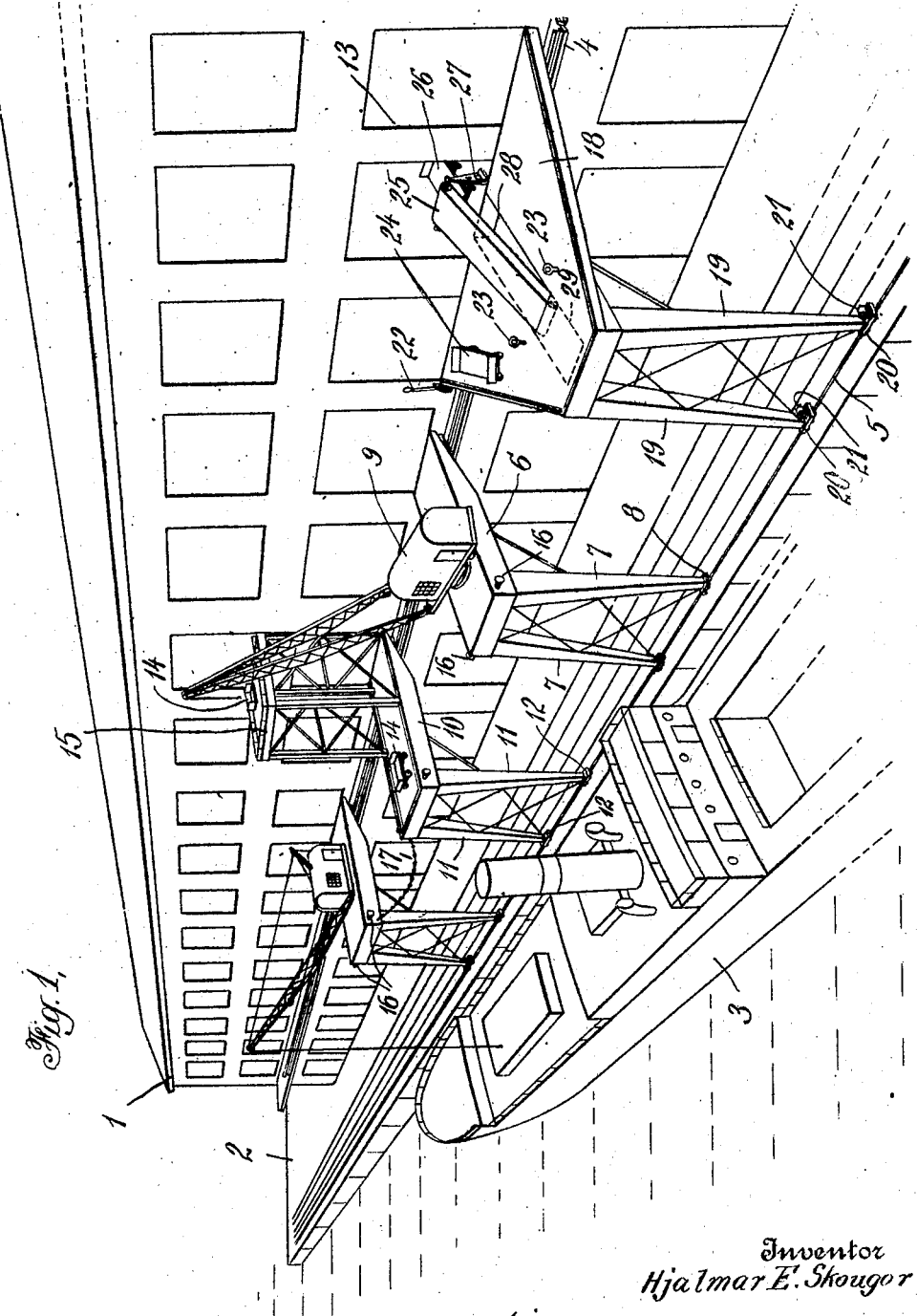

Dec. 23, 1924.

H. E. SKOUGOR

MATERIAL HANDLING EQUIPMENT

Filed May 16, 1921 2 Sheets-Sheet 2

1,520,150

Inventor
Hjalmar E. Skougor
By his Attorneys
Pennie Davis Marvin Edmonds

Patented Dec. 23, 1924.

1,520,150

UNITED STATES PATENT OFFICE.

HJALMAR EJNAR SKOUGOR, OF BROOKLYN, NEW YORK.

MATERIAL-HANDLING EQUIPMENT.

Application filed May 16, 1921. Serial No. 469,830.

*To all whom it may concern:*

Be it known, that I, HJALMAR E. SKOUGOR, a subject of the King of Denmark, residing at Brooklyn, in the county of Kings, State of New York, have invented certain new and useful Improvements in Material-Handling Equipments; and I do hereby declare the following to be a full, clear, and exact description of the invention, such as will enable others skilled in the art to which it appertains to make and use the same.

My invention is an improvement in material handling equipment, and relates particularly to that type designed for handling merchandise between warehouses and carriers, as for instance vessels, railroad cars, and the like. The economical carriage of freight necessitates expeditious handling of cargoes, in loading and unloading, and prompt delivery to and from the warehouse, with a minimum of handling and waste motion. In equipment of the character now in use, the merchandise is taken from the vessel or car, or delivered thereto, by cranes, which are stationed at a hatch of the vessel, or at a car, or which may be a part of the vessel's own equipment for handling freight. Between the crane and the warehouse the merchandise is handled by trucks, which may be run to any part of that floor of the warehouse to which the truck belongs.

To permit the merchandise to be loaded directly onto the truck, or to be taken therefrom, by the crane, warehouses of more than one floor have been provided with loading and unloading platforms, and such platforms are usually provided for by recessing the walls of the upper floors, that is offsetting said walls inwardly. Permanent platforms of any character are objectionable. They must be strongly built, and are for this reason expensive. In addition they encroach materially upon the warehouse space. The object of the present invention is to provide a form of loading and unloading platform that may be positioned at any door opening of a warehouse floor or stage and upon which trucks may be run directly from the warehouse, to receive or discharge merchandise, and which may be easily moved when necessary to any other part of the floor or stage.

Figure 2:
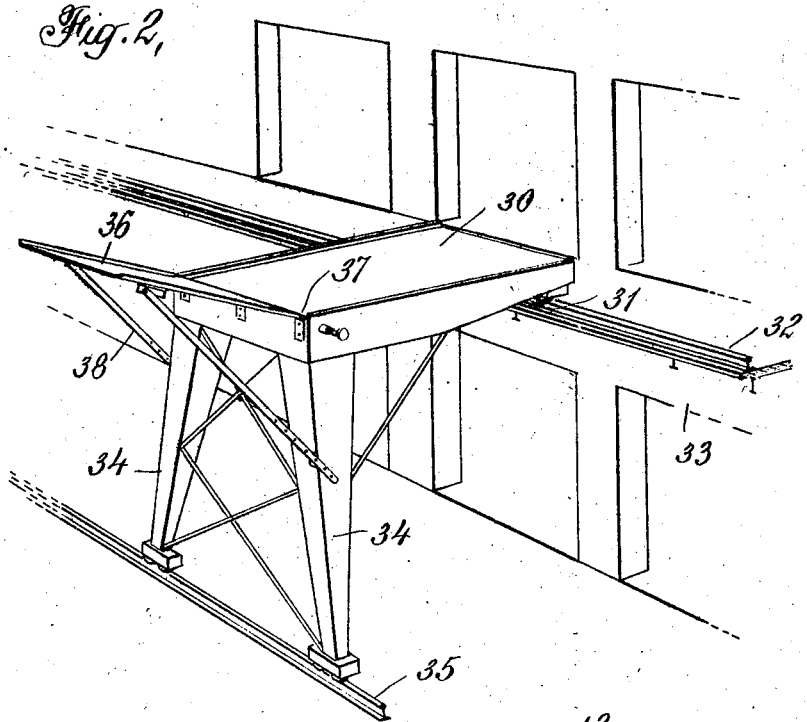
Figure 3:
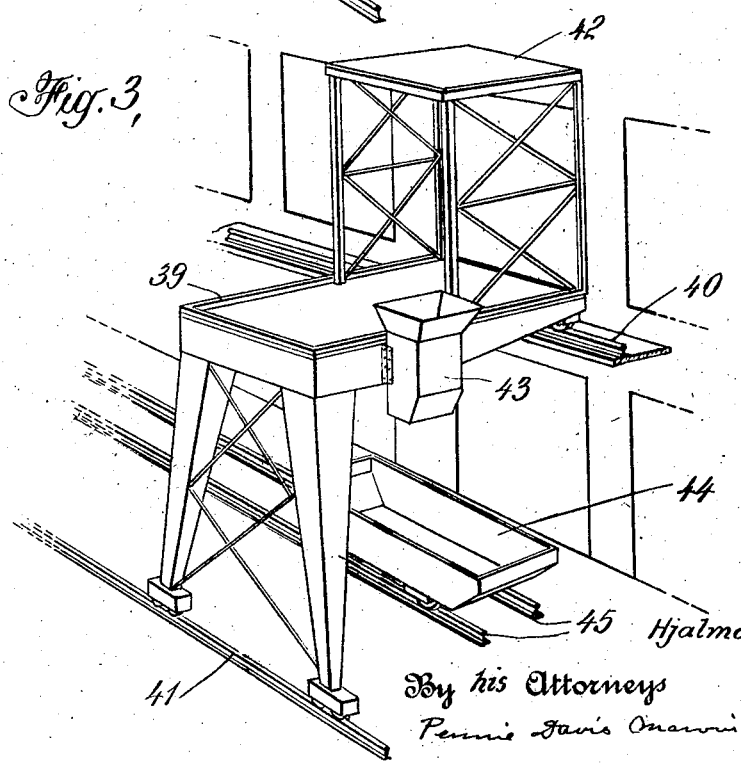

In the drawings:

Figure 1 is a perspective view of a portion of a warehouse provided with the improved platforms, Figures 2 and 3 are perspective views of other embodiments of the invention.

The present embodiment of the invention is shown in connection with a warehouse 1 having a number of floors or stages. A carrier 3 for the merchandise, a vessel in the present instance, is moored alongside the pier 2 upon which the warehouse stands, and a plurality of cranes 9 is provided for handling the merchandise. In order that the cranes may be positioned at different points along the front of the warehouse, they are preferably mounted upon platforms or carriages 6. In order to support the carriages for movement longitudinally of the building, rails 4 and 5 are provided, the rail 4 extending along the front of the building while the rail 5 extends along the pier. One end of each platform 6 has grooved wheels which run upon the rail 4, and the other end has legs or pedestals 7. Each of these legs or pedestals has a shoe 8 carrying grooved wheels which run upon the rail 5, and the said legs or pedestals are suitably braced against each other, and against the platform 6.

A crane mounted as above described, might be arranged at any loading or unloading point, and might deliver merchandise from the carrier to adjacent warehouse doors, or from such doors to the carrier. Such merchandise could not however be loaded directly onto trucks and run into the warehouse, and in order to permit such direct loading or unloading, I provide one or more platforms in connection with each crane supporting platform. These loading and unloading platforms may be of different character. As for instance in Figure 1 there is shown a platform comprising a body 10, having at one end grooved wheels running upon the rail 4, and having at the other pedestals 11 with supporting shoes 12 for wheels, which run upon the rail 5. The upper face of the platform 10 is at the level of the doorway sills of the second floor, and merchandise destined for this floor can be placed directly upon a truck 14 upon the platform. Such merchandise may be moved by truck into the warehouse, and to any portion thereof. It will be obvious that if desired, two platforms might be used with each crane, one upon each side of the crane or two cranes might be used with one platform. Again one loading platform might be so arranged that it would serve two floors, the platform being provided with a superstructure indicated at 15. This superstructure is at the inner end of the body 10 of the loading platform, and the top of the superstructure is a floor or platform which is level with the sills of the doors of the third floor. A truck 14 may be run out upon the superstructure, for receiving merchandise directly from the crane. With this character of loading platform, the merchandise taken from the vessel or other carrier may be deposited upon the superstructure, or upon the body of the platform, depending upon the portion of the warehouse to which it is destined. When a crane is transferred to another position, as for instance to another hatch of a vessel, the loading platform may be moved, either under its own power, or otherwise, to a position adjacent to the crane. Preferably the body 10 of the platform, and the upper surface of the superstructure have retaining railings as shown, and the body of each of the platforms, both those which carry the cranes, and those which are designed to receive cargo, have bumpers indicated at 16 for preventing damage should they engage each other. Each loading platform may be connected to the adjacent crane supporting platform by means of a flexible connection indicated at 17, as for instance a chain or the like. By means of this connection the loading platform may be moved with the crane supporting platform from hatch to hatch of a vessel, or from one car to another.

The platform just described is of a size to serve one door opening 13. The said platforms may however, be of a size to serve several door openings. At the right of Figure 1 for instance, a platform is shown, of a size to serve three door openings. This platform comprises a body 18 of substantially triangular form, and having a base of a length to extend across three door openings. At the apex of the platform depending legs 19 are provided, which carry wheel supporting shoes 20. A motor 21 is carried by each shoe, and the motors are controlled by a controlling lever 22 on the body of the platform. By means of the motors 21, the platform may be moved in either direction, it being understood that the base of the body has grooved wheels running on the rail 4. The legs are suitably braced against the body, and the upper surface of the body is at the level of the sills of the door openings. This form of platform is designed to be moved to either side of the crane, by the crane, and the body of the platform is provided with eyes 23, for the attachment of a hoisting cable to lift the platform. A truck indicated at 24 may be run out upon the platform to receive the merchandise. The platform is also provided with a conveyor indicated generally at 25, and in the form of an endless carrier. By means of this conveyor, merchandise may be moved from the platform to a truck 26 located within the building, the merchandise being deposited on the conveyor by the crane. The inner end of the carrier is supported by bearing standards 27, and preferably the standards are made detachable from the carrier for a purpose to be presently set forth. Referring to Figure 1, it will be seen that the conveyor is arranged within an opening 28 in the body of the platform 18, and that the platform has a pocket indicated at 29 at the outer end of the opening. This pocket is of a size to receive the outer end of the conveyor, so that it may lie in the same plane as the platform body. When the platform is being moved, the carrier is detached from the standards 27, and slipped outwardly and downwardly into the pocket.

In the embodiment of the invention shown in Figure 2, the loading platform comprises a body 30 having at one end grooved wheels indicated at 31 running on the rail 32 supported by the warehouse wall 33. At the other end the platform has depending legs 34 carrying grooved wheels which run upon the rail 35 on the pier, and the legs are suitably braced against the body. A leaf 36 is hinged to the outer end of the platform, as indicated at 37, and arms or struts 38 are pivoted to the leaf at its outer end. Each of these arms or struts 38 has a series of openings at its inner end, which are adapted to register with an opening on the adjacent leg, to receive a securing means, for holding the arm in adjusted position. The leaf may be permitted to swing down against the end of the platform, or it may be used as an extension platform. Again it may be arranged in the inclined position shown in Figure 2, whereby to cause merchandise placed thereon to slide down upon the body. As for instance were a barrel dropped onto this leaf, it would roll over the body of the platform and through the door opening.

In Figure 3 the platform indicated generally at 39, and movable on the rails 40 and 41 has a superstructure 42, whose top is at the level of the doors of the next floor. This platform also has a chute 43 at one side, which is adapted to guide material, as for instance ore, coal or grain into a car 44 running on a track 45 below the platform. This loading platform is similar to that shown at the left of Figure 1, in that it will serve two floors, but in addition it carries a chute for the purpose specified.

In operation, the cranes are arranged at the car, or at the hatch of a vessel, and a loading platform is moved to a point near the crane. The warehouse trucks are run out upon the platforms, with the material to be loaded, or empty to receive material unloaded from the carrier. In either case, as soon as the truck is loaded or unloaded, it may be run into the warehouse, and its place taken by another truck. When the crane is moved to another place, the loading unloading platform may be moved therewith. In the type of platform shown at the right of Figure 1, the merchandise may be placed upon trucks, at either end of the platform, or it may be placed upon the conveyor, and delivered to a truck in the warehouse. The loading and unloading platforms may be also used for transporting the merchandise, from the place where the crane is stationed, to another part of the warehouse.

I claim.

1. In equipment of the class described, the combination with a warehouse having series of door openings at different levels, of a track having a rail extending along the front of the warehouse at substantially the level of one of the series of door openings, and another rail located below and in lateral spaced relation to the first, and a loading and unloading platform movable along the warehouse on the track, the level of this platform being substantially at the level of one of the series of door openings.

2. In equipment of the class described, the combination with a warehouse having a series of door openings, of a track extending along the warehouse having one rail substantially at the level of this series of door openings and another rail disposed below and in lateral spaced relation to the first rail, a loading and unloading platform movable along the track, the level of the platform being substantially the same as the level of the door openings at which the first rail is mounted, and a crane-supporting platform also movable along the track and cooperating with the loading and unloading platform.

3. In equipment of the class described, the combination with a warehouse having a plurality of series of door openings arranged at different levels, of a loading and unloading platform having guided movement along the front of the warehouse, said platform being at the level of one series of door openings, and having a superstructure at a higher series.

4. In equipment of the class described, the combination with a warehouse having series of door openings at different levels, of a rail mounted on and extending along the warehouse at substantially the level of one series of door openings, a second rail extending along the warehouse below and in lateral spaced relation to the first rail, a platform movable along the rails and having a loading surface substantially at the level of the higher rail, and a platform running on the rails and supporting a crane cooperating with the loading platform.

5. In equipment of the class described, the combination with a warehouse having a plurality of series of door openings arranged at different levels, of a track having a rail extending along the warehouse substantially at the level of one series of door openings, and a second rail below and in lateral spaced relation to the first rail, and a platform mounted on the rails and movable therealong, this platform having a surface substantially at the level of one series of door openings and a second surface at the level of a higher series of door openings.

6. In equipment of the class described, the combination with a warehouse having series of door openings at different levels, of a loading and unloading platform having guided movement along the front of the warehouse, this platform having a plurality of merchandise-receiving surfaces arranged one above the other, each of these surfaces being substantially at the level of a series of door openings.

7. In equipment of the class described, the combination with a warehouse having series of door openings at different levels, of a track having a rail extending along the warehouse and located substantially at the level of one series of door openings, and another rail below and in spaced relation laterally to the first, a crane movable on the track, and a platform movable along the track for receiving merchandise from the crane, this platform having surfaces arranged at different levels, each of which is substantially that of the level of a series of door openings.

8. In equipment of the class described, the combination with a warehouse having a plurality of series of door openings at different levels, of a track having a rail mounted on the warehouse wall at substantially the level of one series of door openings, and a second rail located below and in spaced relation to the first, and a loading and unloading platform movable along the track and having a surface for receiving merchandise disposed substantially at the level of one of the series of door openings located above the second rail.

9. In equipment of the class described the combination with a warehouse having a plurality of series of door openings at different levels, a track having a rail mounted on the wall of the warehouse at substantially the same level as one series of door openings, and another rail spaced from the warehouse wall and lying below the first rail, and a loading and unloading platform movable along the track and having a merchandise-receiving surface located substantially at the same level as the first rail, and a superstructure having a merchandise-receiving surface at the level of the door openings of a higher series.

In testimony whereof I affix my signature.

HJALMAR EJNAR SKOUGOR.